(12) United States Patent  (10) Patent No.: US 8,791,665 B2
Davis et al.  (45) Date of Patent: Jul. 29, 2014

(54) ENERGY STORAGE DEVICE SECURITY

(75) Inventors: Roy H. Davis, Del Mar, CA (US); Jeremy D. Dunworth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 12/944,207

(22) Filed: Nov. 11, 2010

(65) Prior Publication Data

US 2011/0248668 A1  Oct. 13, 2011

Related U.S. Application Data

(60) Provisional application No. 61/322,239, filed on Apr. 28, 2010.

(51) Int. Cl.
*H02J 7/00* (2006.01)

(52) U.S. Cl.
USPC .......................................... 320/106; 320/108

(58) Field of Classification Search
USPC .................................. 320/106, 108
See application file for complete search history.

(56) References Cited

U.S. PATENT DOCUMENTS

| | | | |
|---|---|---|---|
| 7,667,429 B2 * | 2/2010 | Little | 320/106 |
| 2007/0145945 A1 | 6/2007 | McGinley et al. | |
| 2008/0051986 A1 | 2/2008 | Amano et al. | |
| 2008/0211455 A1 * | 9/2008 | Park et al. | 320/108 |
| 2009/0001932 A1 | 1/2009 | Kamijo et al. | |
| 2012/0118595 A1 | 5/2012 | Pellenc | |

FOREIGN PATENT DOCUMENTS

| | | |
|---|---|---|
| DE | 3803357 | 8/1989 |
| EP | 1150531 A2 | 10/2001 |
| EP | 1594209 A1 | 11/2005 |
| EP | 2110922 A2 | 10/2009 |
| JP | 2001312472 A | 11/2001 |
| JP | 2006164547 A | 6/2006 |
| JP | 2007035479 A | 2/2007 |
| JP | 2008052408 A | 3/2008 |
| JP | 2009011129 A | 1/2009 |
| JP | 2009504117 A | 1/2009 |
| JP | 2009512035 A | 3/2009 |
| JP | 2009272299 A | 11/2009 |
| JP | 2009273219 A | 11/2009 |
| WO | WO03079525 A2 | 9/2003 |
| WO | WO-2007015599 | 2/2007 |
| WO | WO-2009063144 A2 | 5/2009 |

OTHER PUBLICATIONS

Dallas Semiconductor, "Battery Identification Chip", DS2434, Jul. 31, 1997, pp. 1-20.

(Continued)

*Primary Examiner* — Richard V Muralidar
(74) *Attorney, Agent, or Firm* — Knobbe Martens Olson & Bear LLP

(57) ABSTRACT

Exemplary embodiments are directed to energy storage device security. An energy storage device may include at least one energy storage cell and a controller. The controller may be configured to request device identification data from an electronic device coupled to the energy storage device and compare the device identification data to device identification data stored in the energy storage device. The controller may be further configured to enable energy to be conveyed from the at least one energy storage cell to the electronic device if the device identification matches the stored device identification data.

15 Claims, 11 Drawing Sheets

(56) References Cited

OTHER PUBLICATIONS

Dallas Semiconductor, "Battery Identification/Monitor Chip for Dallas. Semiconductor Integrates Voltage A/D Converter and Temp Sensing", http://www.maxim-ic.com/company/newsroom/pr_products/show.mvp/npk/242, Apr. 26, 2012, pp. 1-2.

Texas Instruments, "High-performance battery monitor IC with Coulomb Counter, Voltage and, Temperature", bq26200, SLUS521B, Aug. 2002, pp. 23, Revised Feb. 2004.

International Search Report and Written Opinion—PCT/US2011/031848—ISA/EPO—Dec. 21, 2011.

\* cited by examiner

ENERGY STORAGE DEVICE SECURITY

CLAIM OF PRIORITY UNDER 35 U.S.C. §119

This application claims priority under 35 U.S.C. §119(e) to: U.S. Provisional Patent Application 61/322,239 entitled "MOBILE ELECTRONIC DEVICE BATTERY SECURITY" filed on Apr. 8, 2010, the disclosure of which is hereby incorporated by reference in its entirety.

BACKGROUND

1. Field

The present invention relates generally to wireless power transfer, and more specifically, to systems, device, and methods related to security of an energy storage device.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

The latest portable electronic devices combine various capabilities, such as capabilities of a cell phone, a media player, and a laptop computer. A downside of this much capability in single device is that the battery is drained quickly requiring frequent recharge. It is desirable to recharge these devices in public places, such as airports, shopping malls and coffee shops. It is also desirable for the user to be able to move about the public places while the device is recharged. Further, it is desirable to secure the battery while it is being recharged. This could be accomplished by physical security at the kiosk, but this scheme is prone to circumvention by physical means and places the liability on the owner of the kiosk.

A need exists for methods, systems, and devices to enhance security of removable, rechargeable batteries. More specifically, a need exists for methods, systems, and devices for enhancing the security of a battery being charged in a public battery charger.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors.

Figure 1:
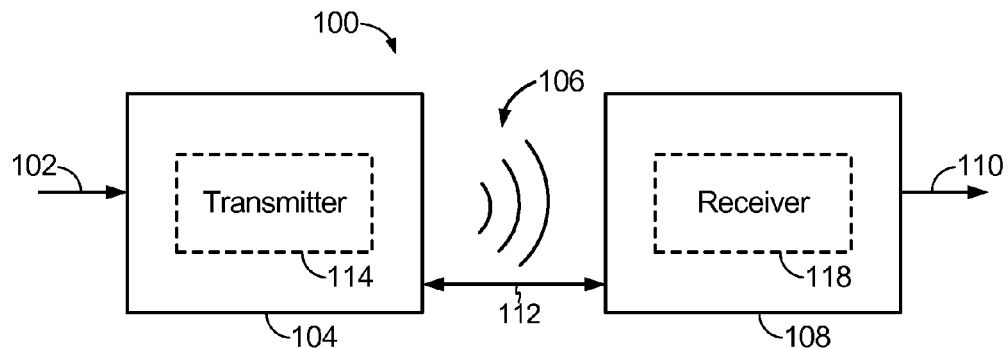
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
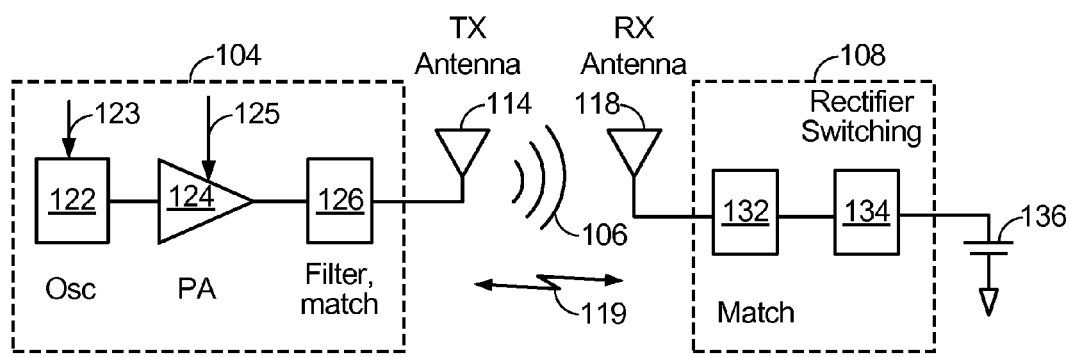
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
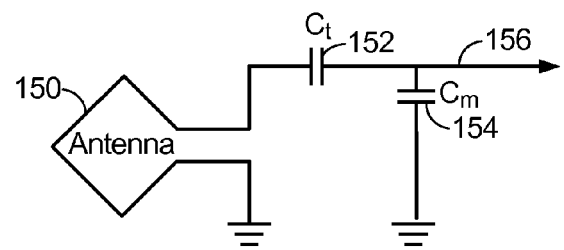
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
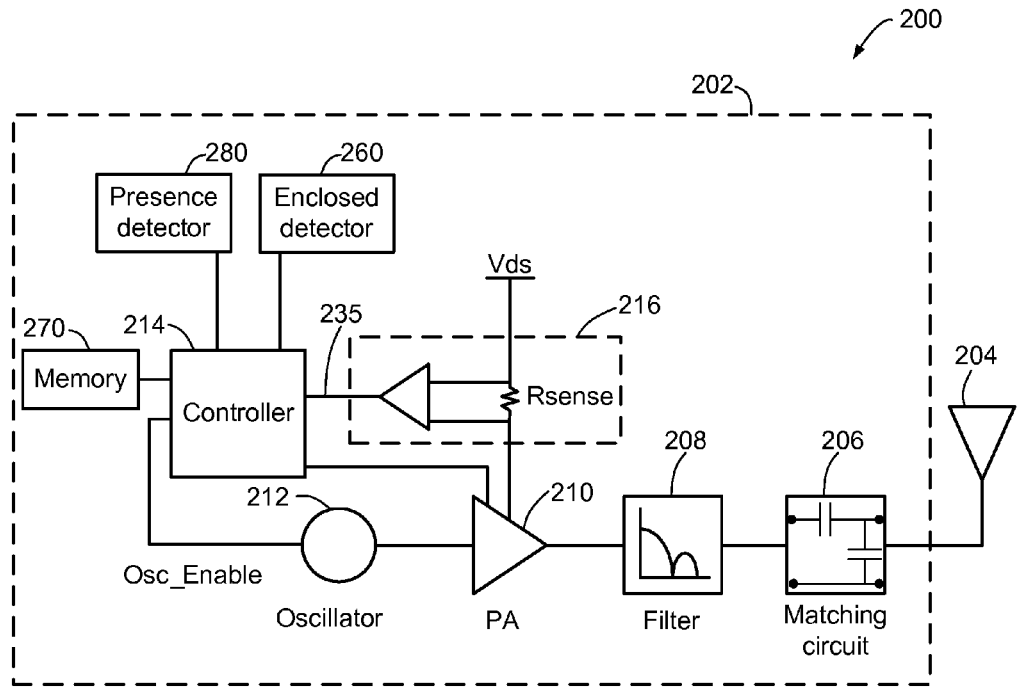
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
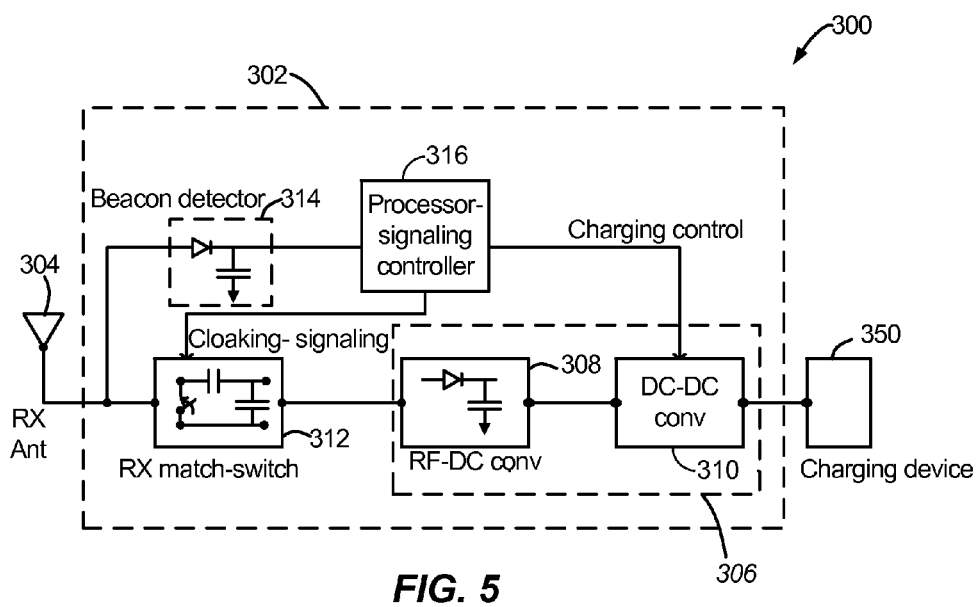
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments of the present invention, as described herein, relate to systems, devices, and methods for enhancing security of rechargeable energy storage devices (e.g., batteries), which are removable from an electronic device. According to one exemplary embodiment, a rechargeable energy storage device may be paired with a specific electronic device and may not operate properly unless coupled to the specific electronic device. Thus, the energy storage device may be useless to others. Accordingly, the likelihood that the energy storage device may be stolen from a public wireless charger may be decreased.

According to one exemplary embodiment of the present invention, a protection switch within a removable, rechargeable energy storage device, a communication link between the energy storage device and an associated electronic device, and identification data associated with the associate electronic device may be utilized to perform a security check prior to providing energy from the energy storage device to the electronic device. More specifically, according to one exemplary embodiment, upon an initial pairing (i.e., during a first use) of a rechargeable, removable energy storage device with an electronic device, the electronic device may supply identification data (e.g., an identification code) to the energy storage device. Upon receipt thereof, the battery may store the identification data. Further, on subsequent uses, after being removed, receiving a charge, and coupled to an electronic device, the energy storage device may request identification data (e.g., an identification code) from the electronic device, and, upon receipt thereof, the energy storage device may compare the received identification data with the stored identification data. If the received identification data and the stored identification data match, the energy storage device may provide power to the electronic device. On the other hand, if the received identification data and the stored identification data do not match, the energy storage device and the electronic device are not "paired" and energy may not be conveyed from the energy storage device to the electronic device.

As noted above, an energy storage device may receive identification data from an electronic device, which is attempting to receive energy therefrom. An energy storage device may obtain device identification from an electronic device by any suitable method. According to one exemplary embodiment, a rechargeable energy storage device may use its charging circuit to communicate with an electronic device in a passive RFID mode, wherein the electronic device acts as a passive RFID and the energy storage device acts as an RFID reader. According to another exemplary embodiment, the energy storage device may provide power for a limited amount of time, and if the energy storage device does not authenticate the electronic device, the energy storage device may stop providing power.

In accordance with another exemplary embodiment, the energy storage device may provide a low level of power (e.g., 10 mA at 3.2 volts), which is suitable for authentication of the electronic device, but not enough for other circuits of the electronic device to power on. According to yet another exemplary embodiment, the energy storage device may provide a current limited level of power, for example, by having a large series resistor that causes an unacceptable voltage drop in parallel with a protection switch circuit of the battery. It is noted that in embodiments wherein the energy storage device provides power for some limited amount of time, a short delay between the mismatching of device identification data and the current from the energy storage device being disabled may allow for an unlocking scheme, as described more fully below.

Device identification data, which is conveyed from an electronic device to a rechargeable, removable energy storage device, may comprise any suitable data that may be used to uniquely identify the electronic device. For example only, device identification data may comprise an identification string, such as the Electronic Serial Number (ESN) of the electronic device. According to one exemplary embodiment, once the energy storage device records the ESN of the electronic device, which it is associated with, the energy storage device may not function, beyond the ID exchange, with any other electronic device. It is noted that the device identification data may be encrypted on a communication link between a controller of the electronic device and the protection switch controller of the energy storage device.

In the event that device identification data, which is provided by an electronic device, does not match identification data stored within the energy storage device, an unlock scheme may be implemented. According to one exemplary embodiment, an unlock scheme may use a user interface (UI) of the electronic device and may require a user of the electronic device to supply a pass code. Upon receipt of a valid pass code, the energy storage device may reset to an "unpaired" state, and, thereafter, may be associated with a new electronic device, a replacement electronic device, or a different device as selected by the user. According to another exemplary embodiment, an unlock scheme may require communication with a Website wherein stored owner/user data may be used to authenticate the user and supply a pass code either directly to the electronic device for exchange with the energy storage device or to the user for manual entry.

Additionally, according to an exemplary embodiment, the energy storage device may be configured to operate with more than one electronic device. For example, a user, via a user interface of an electronic device, may expand the number of valid electronic devices that are associated with the energy storage device (i.e., from the default of one). The energy storage device would then be paired with each of the valid devices as determined by the user.

Figure 6:
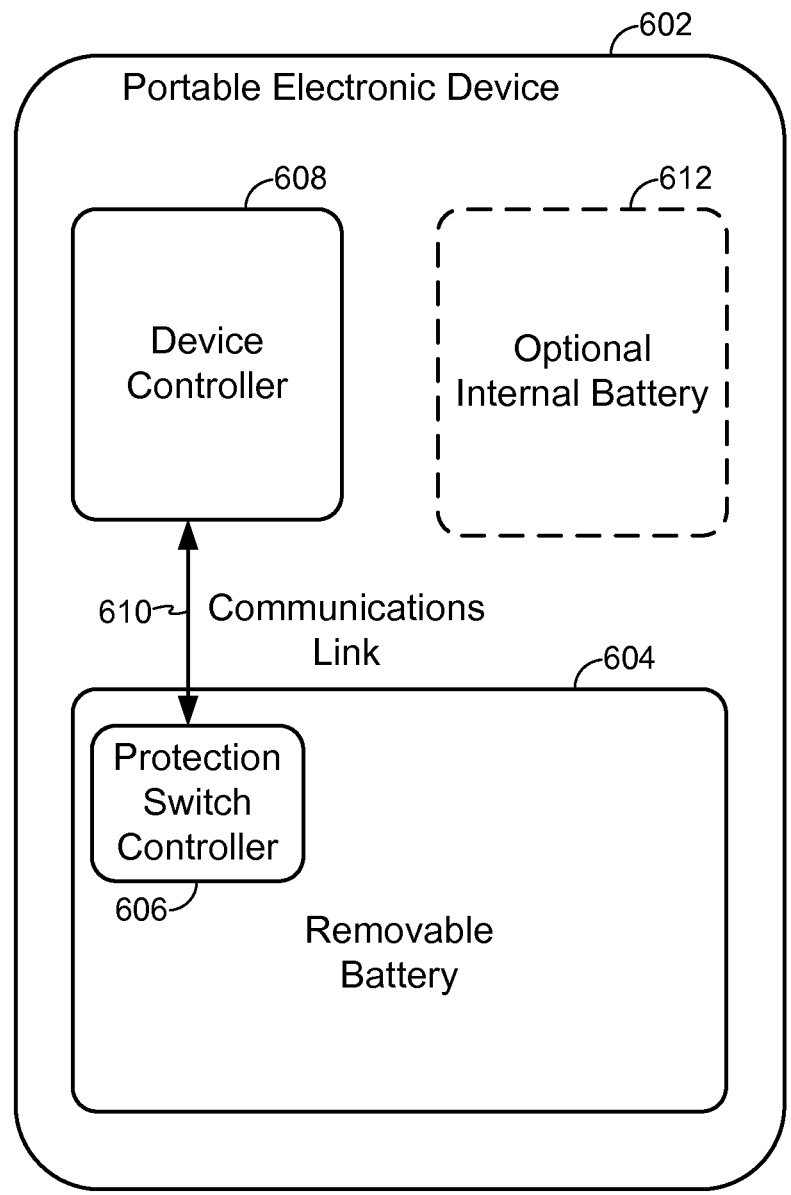
FIG. 6 illustrates an electronic device having a removable energy storage device coupled thereto, according to an exemplary embodiment of the present invention.

Various exemplary embodiments of the present invention will now be described with reference to FIGS. 6-15. FIG. 6 depicts a portable electronic device 602, such as a mobile telephone, which contains an energy storage device 604. It is noted that energy storage device 604 may also be referred to herein as a battery. Removable battery 604 may include a protection switch controller 606. A communications link 610 may exist between protection switch controller 606 and a device controller 608 of electronic device 602 for controlling the charging of removable battery 604, monitoring one or more conditions of removable battery 604, or a combination thereof. Communication link 610 may enable various exemplary embodiments of invention to be implemented with very little or no recurring cost to either battery 604 or a device (e.g., device 602) configured to couple to battery 604.

Electronic device 602 may also include an internal battery 612 for continued use of electronic device 602, while removable battery 604 is removed from electronic device 602. It is noted that the present invention may be implemented as software embedded in protection switch controller 606, device controller 608, or a combination thereof.

Figure 7A:
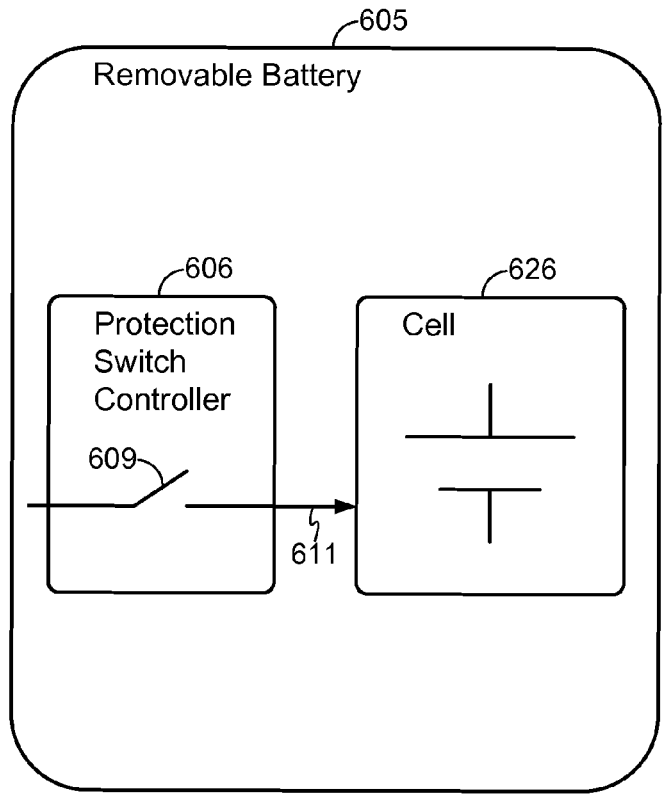
FIG. 7A is a block diagram of a removable energy storage device in accordance with an exemplary embodiment of the present invention.

FIG. 7A illustrates a removable battery 605 including switch protection switch controller 606 and energy storage cell 626 configured for storing energy. It is noted that energy storage cell comprise a single storage cell or a plurality of storage cells. As described more fully below, removable battery 605 may be configured to receive power from a wired power charger. As illustrated, protection switch controller 606 comprises a switch 609 for controlling an amount of current that is transmitted to and from energy storage cell 626 via link 611. Removable battery 605 may be one embodiment of removable battery 604 illustrated in FIG. 6

Figure 7B:
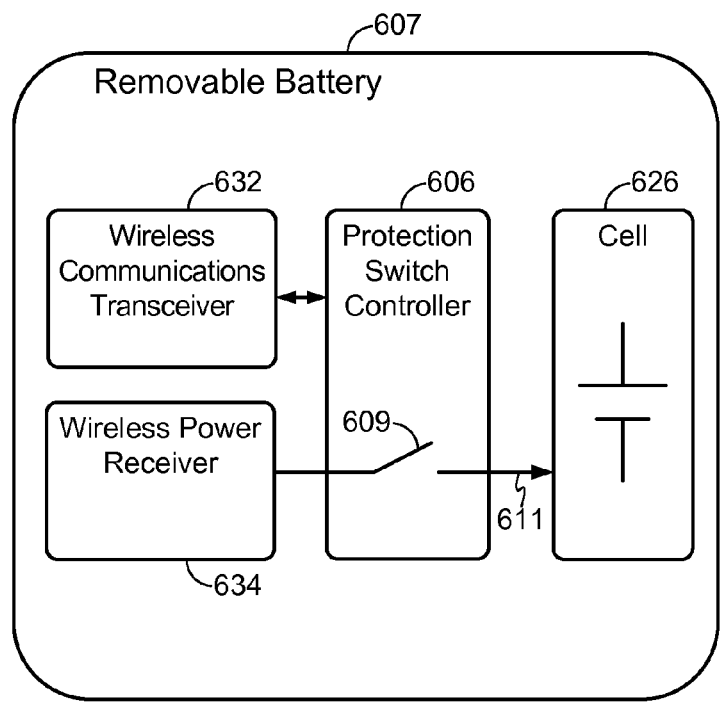
FIG. 7B illustrates is a block diagram of another removable energy storage device, in accordance with an exemplary embodiment of the present invention.

FIG. 7B illustrates a removable battery 607 including protection switch controller 606, energy storage cell 626, a wireless communications transceiver 632, and a wireless power receiver 634. As described more fully below, removable battery 607 may be configured to receive power from a wireless power charger. Wireless communication transceiver 632 may be coupled to and may communicate with protection switch controller 606. Moreover, energy may be conveyed from wireless power receiver 634 to energy storage cell 626 via switch 609 and link 611. Removable battery 607 may be another embodiment of removable battery 604 illustrated in FIG. 6.

Figure 8:
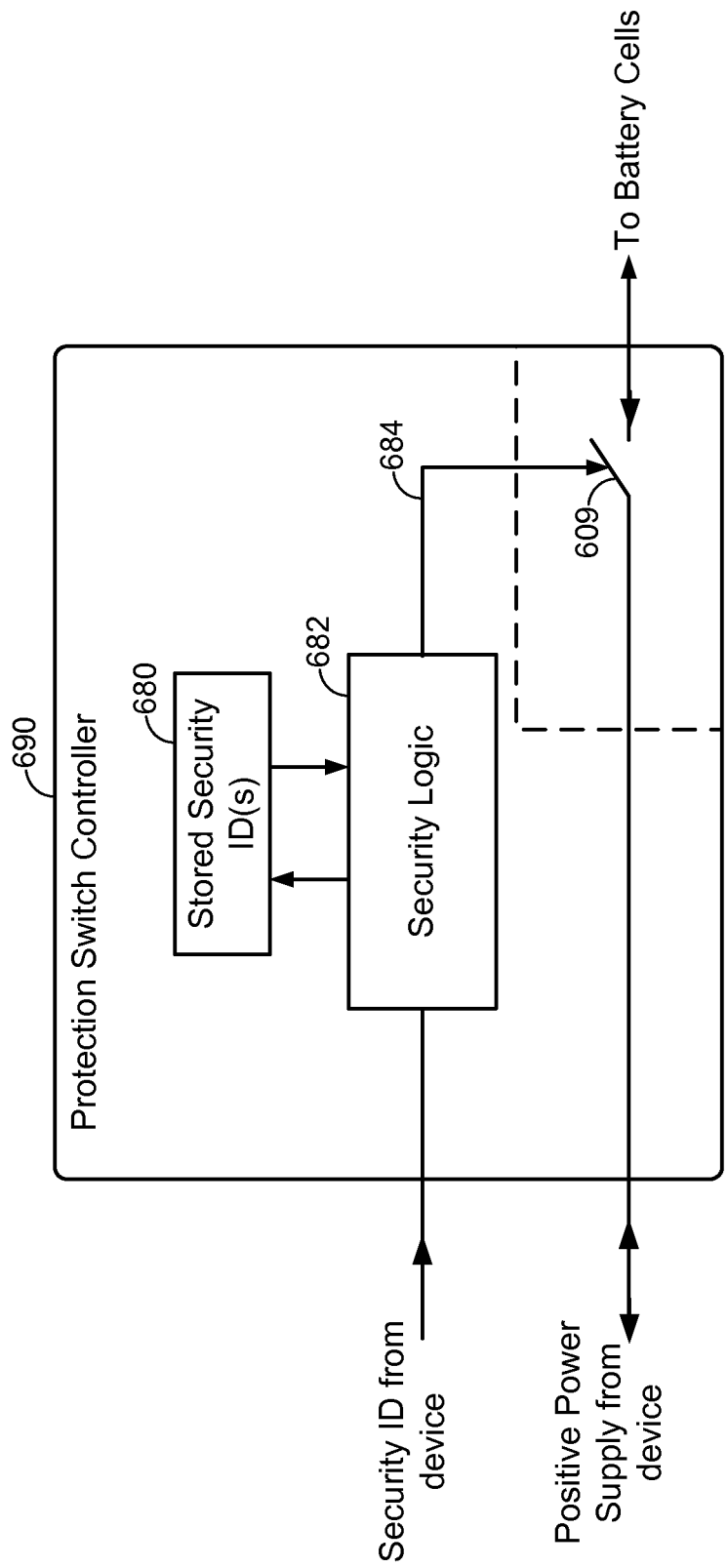
FIG. 8 illustrates a switch protection controller of a removable energy storage device, according to an exemplary embodiment of the present invention.

FIG. 8 illustrates an example of a protection switch controller 690 according to one exemplary embodiment of the present invention. Protection switch controller 690 may be one embodiment of protection switch controller 606 illustrated in FIGS. 6, 7A, and 7B. Protection switch controller 690 comprises a database 680 configured to store device identification data, such as one or more security codes. Protection switch controller 690 further comprises security logic 682, which may be in communication with database 680 and switch 609. As noted above, switch 609 may enable energy to be transmitted from a power supply of, for example, a battery charger, to an energy storage cell of an associated battery (e.g., battery 604).

In operation, security logic 682 may receive device identification data from an electronic device and, in response thereto, may store the received data (i.e., if an associated battery is "unpaired") in database 680 or compare the received data (i.e., if an associated battery is "paired") to device identification data previously stored in database 680. Furthermore, security logic 682 may be configured to control a configuration of switch 609. More specifically, for example, if received identification data (i.e., a security code) does not match identification data previously stored in database 680, security logic 682 may open switch 619 to prevent energy from being conveyed from an energy storage cell of a battery to a device coupled to the battery. As another example, if received identification data (i.e., a security code) does match identification data previously stored in database 680, security logic 682 may close switch 619 to enable energy to be conveyed from an energy storage cell of a battery to a device coupled to the battery.

Figure 9:
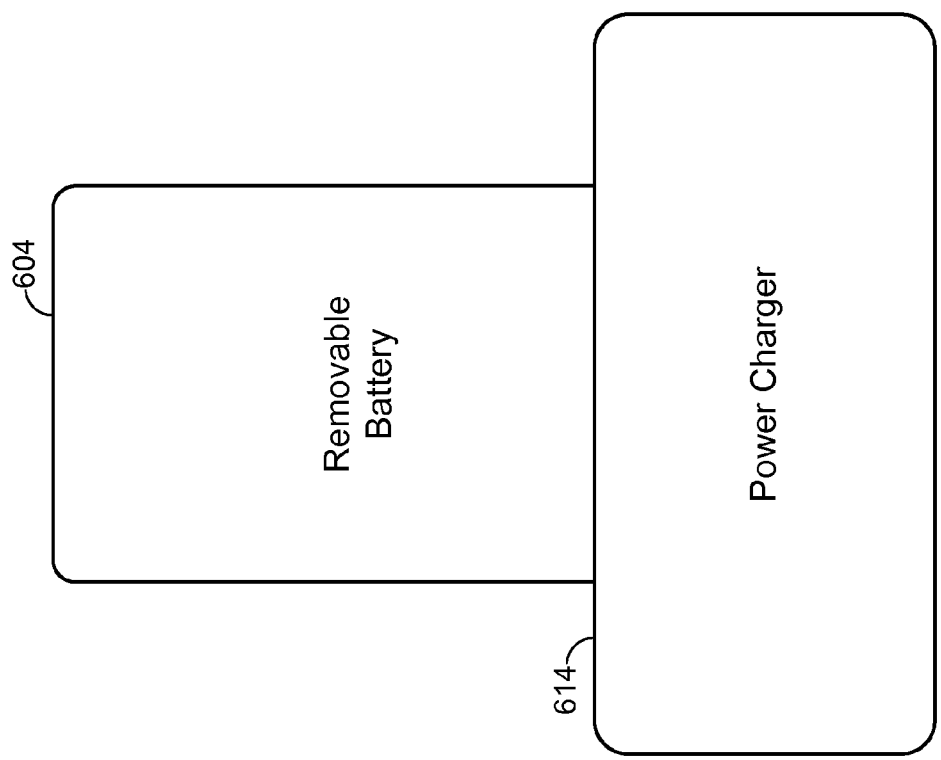
FIG. 9 illustrates a removable energy storage device positioned proximate a power charger, according to an exemplary embodiment of the present invention.

FIG. 9 illustrates a rechargeable, removable battery 604 positioned proximate a power charger 614, which may comprise a wired battery charger, a wireless battery charger, or a battery charger configured for both wired and wireless charging. As will be understood by a person having ordinary skill in the art, removable battery 604 has been removed from electronic device 602 (see FIG. 6) and placed proximate to power charger 614.

Figure 10:
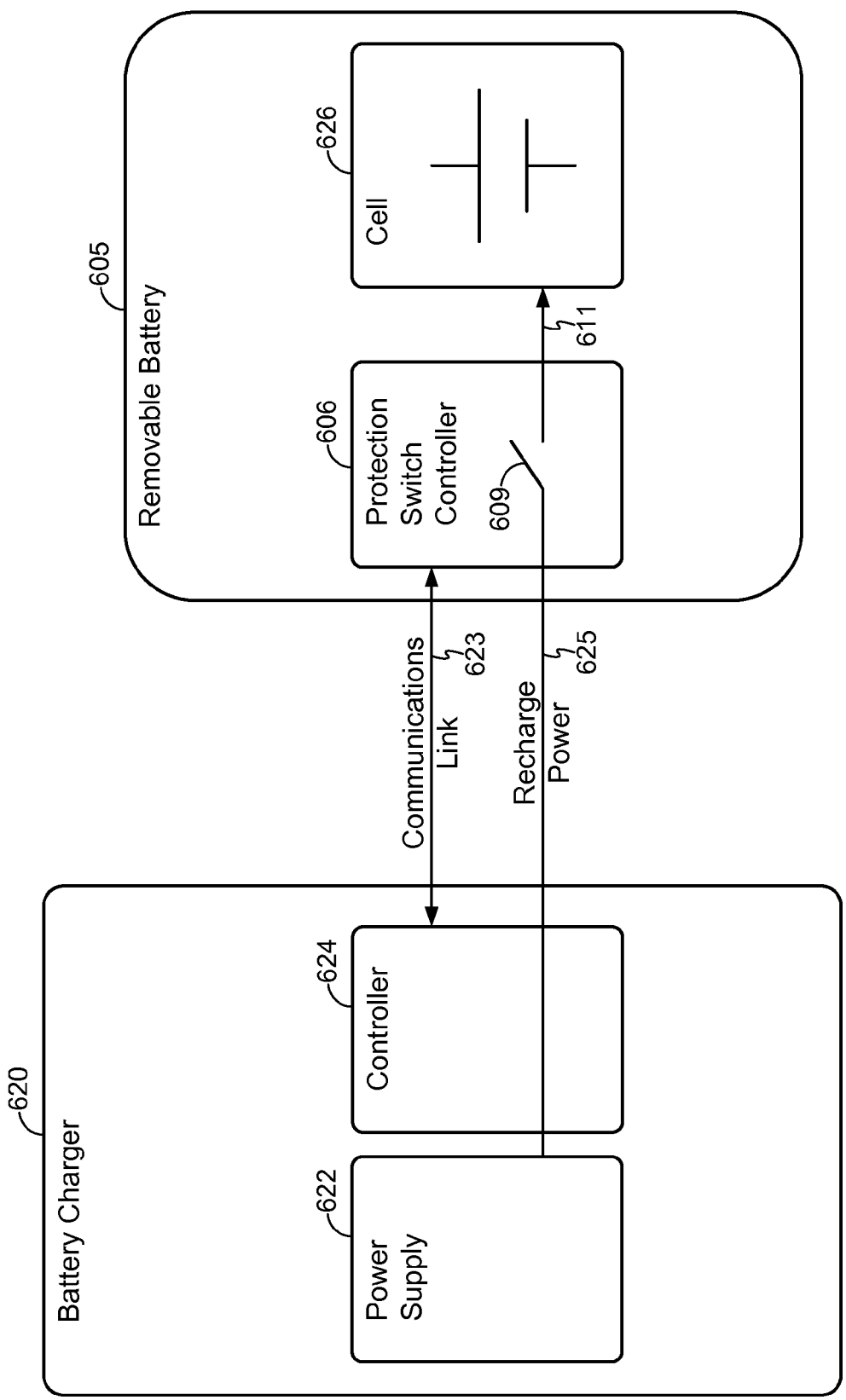
FIG. 10 illustrates a charger coupled to a removable energy storage device, according to an exemplary embodiment of the present invention.

FIG. 10 depicts an interface between a wired battery charger 620 and removable battery 605. Battery charger 620 includes a power supply 622 and a controller 624. Power supply 622 may be configured to transmit power, via link 625, to energy storage cell 626, which may be configured to receive and store energy. As noted above, protection switch controller 606 may include a switch 609 for controlling an amount of current transferred to and from energy storage cell 626. This is a safety feature in conventional batteries to protect an energy storage cell (e.g., energy storage cell 626) from over-current (both recharging and discharging), over discharge and from overheating. Further, according to one exemplary embodiment, controller 624 may be configured to communicate with protection switch controller 606 via a communications link 623. According to another exemplary embodiment, a communication link between battery charger 620 and removable battery 605 may be implemented by modulating the power transmitted from power supply 622 to cell 626 via communication link 625.

Figure 11:
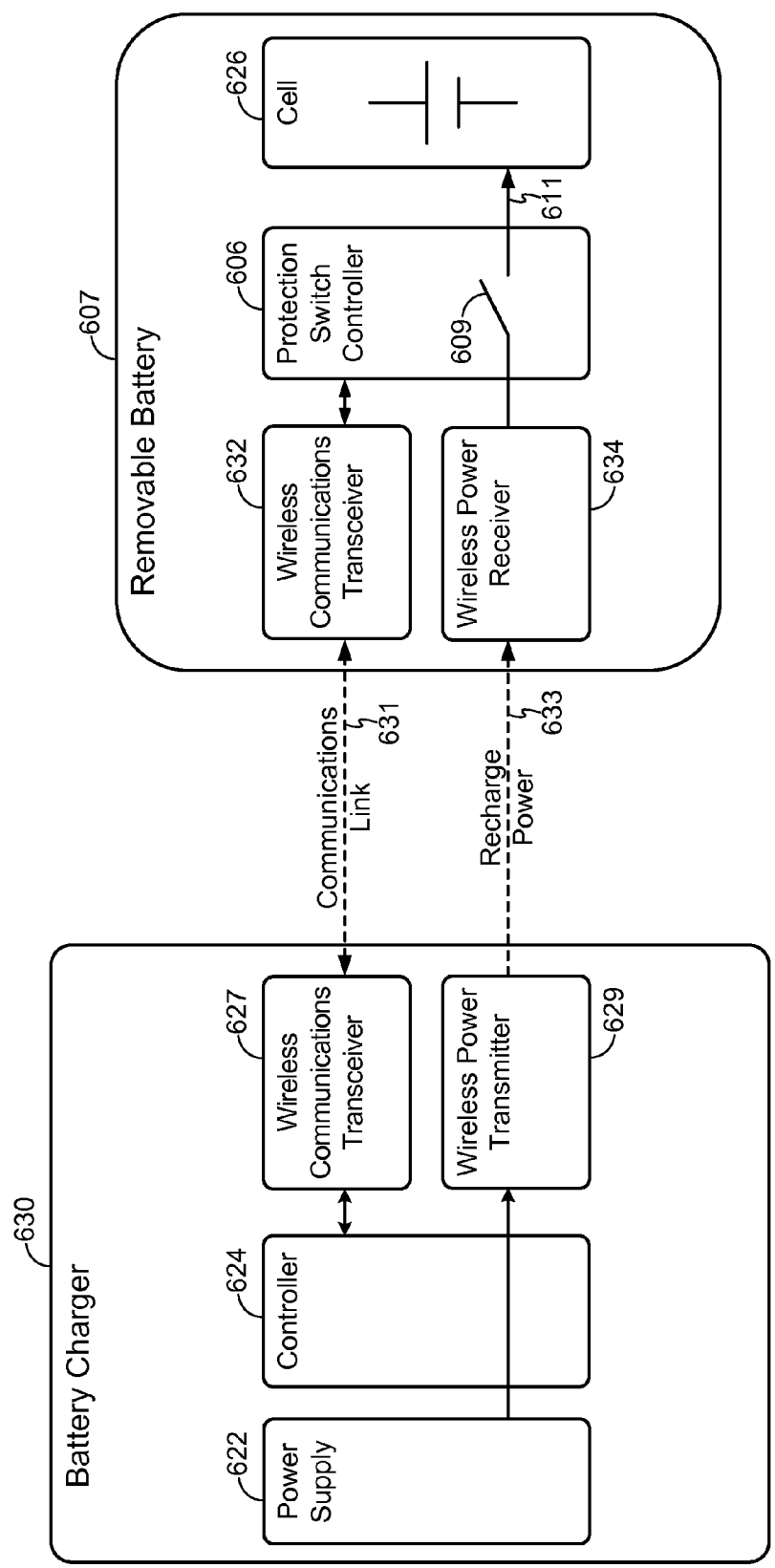
FIG. 11 illustrates another charger coupled to another removable energy storage device, in accordance with an exemplary embodiment of the present invention.

FIG. 11 depicts an interface between a wireless battery charger 630 and removable battery 607. Battery charger 630 includes power supply 622, controller 624, wireless communications transceiver 627, and wireless power transmitter 629. In addition to protection switch controller 606 and energy storage cell 626, removable battery 607 includes wireless communications transceiver 632 and wireless power receiver 634. Power supply 622 may be configured to transmit power, via wireless power transmitter 629, link 633, wireless power receiver 634, and switch 609 to energy storage cell 626, which may be configured to receive and store energy. As noted above, switch 609 may be configured for controlling an amount of current to and from energy storage cell 626. Wireless communication transceiver 632 may be coupled to and may communicate with protection switch controller 606. Moreover, energy may be conveyed from wireless power receiver 634 to energy storage cell 626 via switch 609. It is noted that link 633 may be implemented by magnetic induction. Furthermore, communication between battery charger 630 and battery 607 may be implemented by modulating a signal over link 633, or with a separate radio link.

With reference to FIGS. 6-11, a contemplated operation of "pairing" a battery (e.g., battery 604) with an electronic device will now be described. Initially, battery 604 is coupled to (e.g., inserted in) electronic device 602. It is noted that battery 604 is not currently "paired" with another electronic device. Upon coupling to electronic device 602, protection switch controller 606 may request device identification data from electronic device. Electronic device 602, via a communication link (e.g., communication link 623 or communication link 631), may transmit associated device identification data and, upon receipt thereof, battery 604 may store the device identification data therein. At this point, battery 604 is "paired" to electronic device 602. Battery 604 may then provide power to electronic device 602. Moreover, at anytime suitable time, battery 604 may be decoupled (i.e. removed) from electronic device 602 and positioned within a battery charger (e.g., wired battery charger 620 or wireless battery charger 630) for receiving energy therefrom.

With further reference to FIGS. 6-11, a contemplated operation of validating an electronic device upon battery 604 being coupled thereto will now be described. It is noted that battery 604 is currently "paired" with an electronic device, which may or may not be the electronic device coupled thereto. Initially, battery 604 is coupled to (e.g., inserted in) an electronic device (e.g., electronic device 602). Upon coupling to electronic device 602, battery 604 and, more specifically, protection switch controller 606, may request device identification data from the electronic device. The electronic device, via a communication link (e.g., communication link 623 or communication link 631), may transmit associated device identification data and, upon receipt thereof, battery 604, and more specifically, protection switch controller 606, may compare the received device identification data with previously stored device identification data. If the received device identification data matches the previously stored device identification data, then battery 604 and, more specifically, protection switch controller 606, may provide power to the electronic device (i.e., battery 604 may allow the electronic device to draw current). If the received device identification data does not match the previously stored device identification data, then battery 604 and, more specifically, protection switch controller 606, may refuse to provide power to the electronic device (i.e., battery 604 may prevent current from being drawn from the electronic device). As noted above, battery 604 may provide a limited amount of power to an electronic device to enable a validation process to be completed.

With reference to FIGS. 6-11, a contemplated operation of unlocking a battery that has become locked due to installation in an invalid device, or due to an error in the validation procedure of a valid device. It is noted that the following described operation may be used to allow spare batteries to be shared between multiple devices. After battery 604 has determined that the received device identification data does not match the previously stored device identification data and battery 604 is preventing energy from being provided to the electronic device, a user may initiate a process to unlock battery 604. To unlock battery 604, the user may enter a code via a user interface of the electronic device. Upon receipt of a code, the user interface may transmit the code to the battery. Upon receipt of the user-provide code, battery 604 and, more specifically, protection switch controller 606, may compare the user-provided code to a unlock code, which is stored within battery 604 (e.g. within database 680). If the user-provided code matches the previously stored unlock code, then battery 604 and, more specifically, protection switch controller 606, may set battery 604 to an "unpaired" state. If the user-provided code does not match the previously stored unlock code, then battery 604 and, more specifically, protection switch controller 606, may continue to allow power to be provided to the electronic device (i.e., battery 604 remains disabled).

Figure 12:
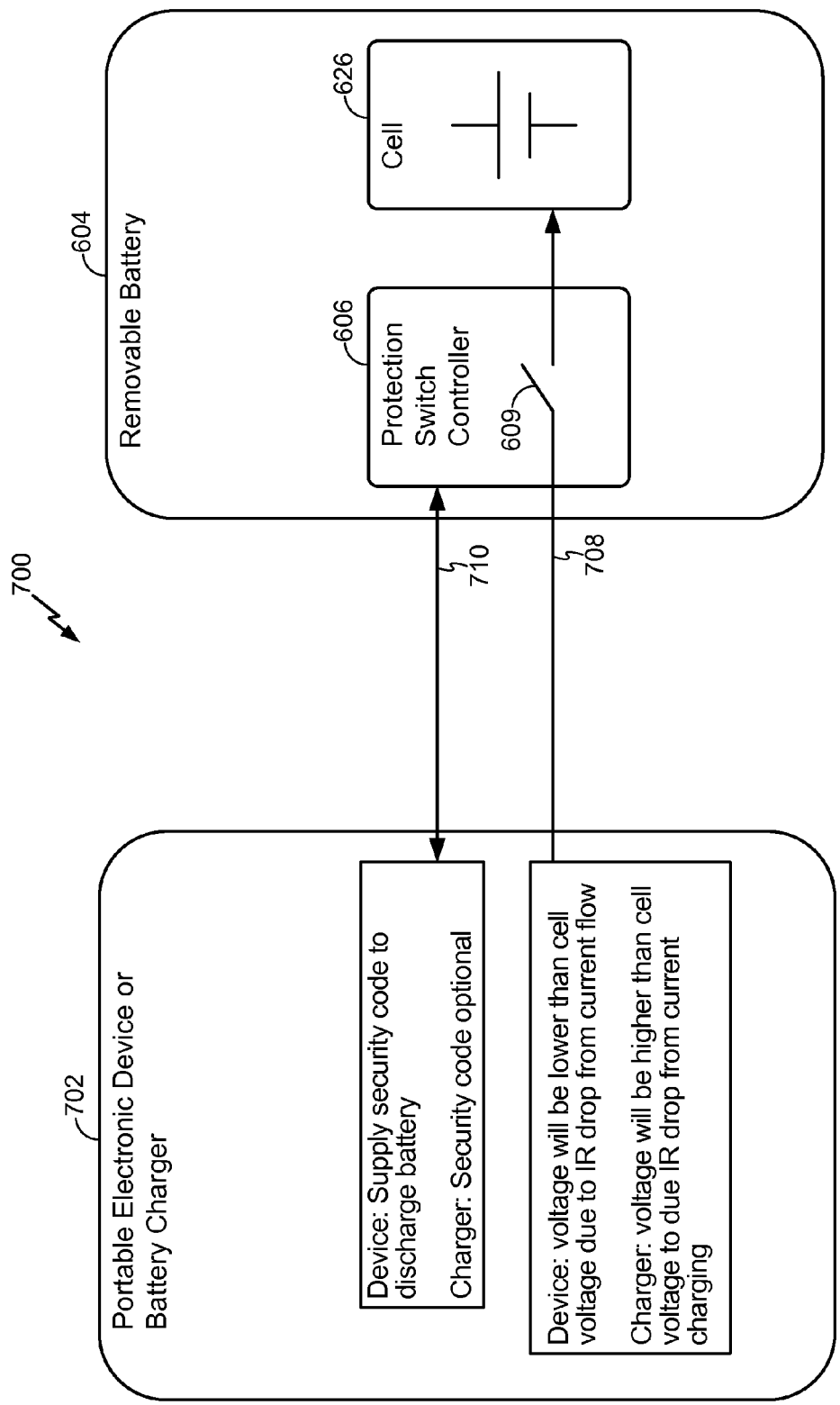
FIG. 12 illustrates a device coupled to a removable energy storage device, according to an exemplary embodiment of the present invention.

It is noted that battery 604 may be configured to require a valid security code (i.e., device identification data) from a device (e.g., a portable electronic device or a battery charger) prior to be discharged (i.e., conveying energy to an electronic device), prior to being charged (i.e., receiving energy from a battery charger) or both. It is further noted that battery 604 may be configured to determine whether it is being charged or discharged. With reference to FIG. 12, battery 604 is coupled to a device 702, which may comprise either an electronic device (e.g., a mobile telephone) or a battery charger. Via link 708, which may couple switch 609 to a voltage within device 702, a voltage at a terminal of cell 626 may be compared to a voltage within device 702 such as voltage at link 708 provided to protection switch 609. If the voltage at cell 626 is higher than the voltage at link 708, then device 702 comprises a portable electronic device and device 702 is attempting to receive energy from battery 604 (i.e., battery 604 is discharging). It is noted that if device 702 comprises a portable electronic device and device 702 is attempting to receive energy from battery 604, battery 604 may require a valid security code, via a link (e.g., communication link 710), prior to providing energy to device 702. If the voltage at cell 626 is lower than the voltage at link 708, then device 702 comprises battery charger and device 702 is attempting to convey energy to battery 604 (i.e., battery 604 is charging). It is noted that if device 702 comprises battery charger and device 702 is attempting to convey energy to battery 604, battery 604 may or may not require a valid security code prior to receiving energy from device 702. It is noted that protection switch controller 606 may comprise an existing battery protection switch in a battery which prevents battery cell voltage from going above or below a specified cell voltage range.

Figure 13:
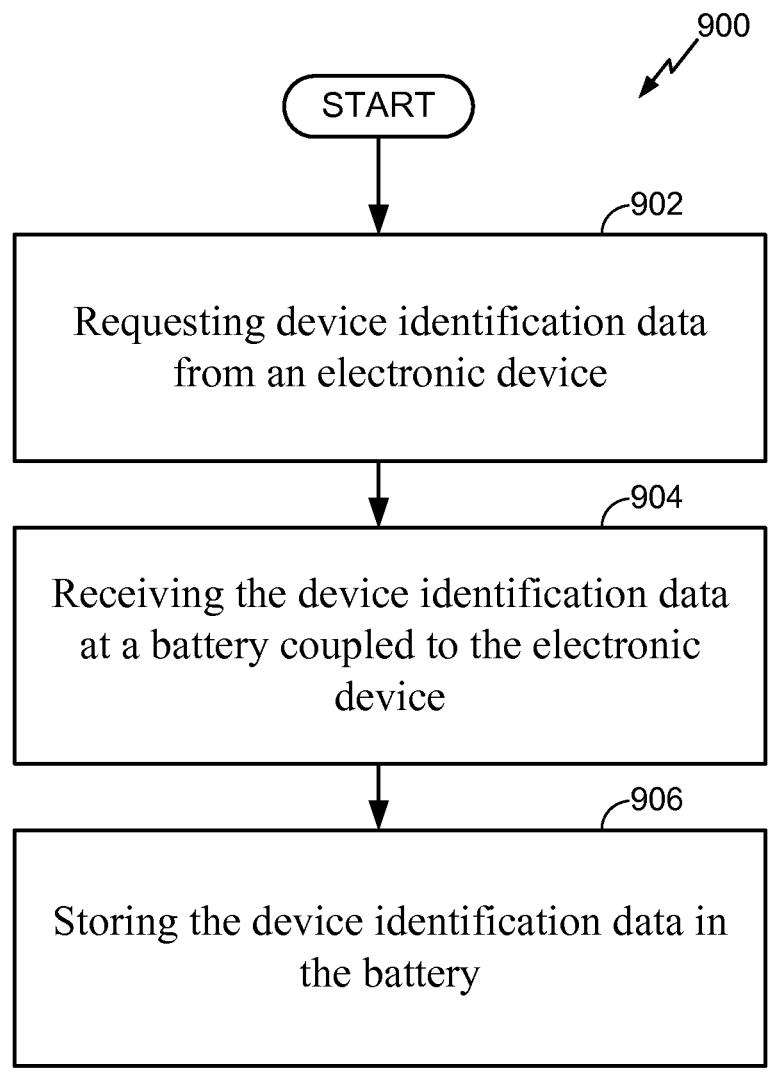
FIG. 13 is a flowchart illustrating a method, in accordance with an exemplary embodiment of the present invention.

FIG. 13 is a flowchart illustrating another method 900, in accordance with one or more exemplary embodiments. Method 900 may include requesting device identification data from an electronic device coupled to an energy storage device (depicted by numeral 902). Method 900 may further include receiving the device identification data at the energy storage device (depicted by numeral 904). Additionally, method 910 may include storing the device identification data in the energy storage device (depicted by numeral 906).

Figure 14:
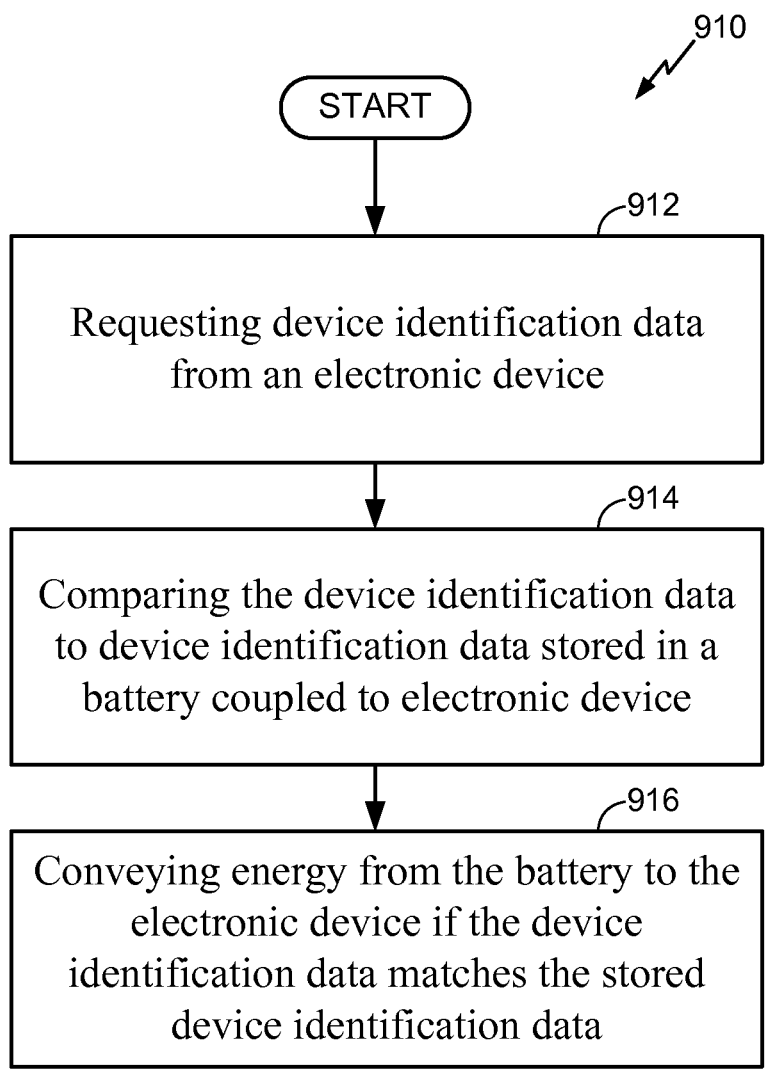
FIG. 14 is a flowchart illustrating another method, in accordance with an exemplary embodiment of the present invention.

FIG. 14 is a flowchart illustrating another method 910, in accordance with one or more exemplary embodiments. Method 910 may include requesting device identification data from an electronic device (depicted by numeral 912). Method 910 may further include comparing the device identification data to device identification data stored in an energy storage device coupled to electronic device (depicted by numeral 914). Additionally, method 910 may include conveying energy from the energy storage device to the electronic device if the device identification data matches the stored device identification data (depicted by numeral 916).

It is noted that a battery, according to the various exemplary embodiments described herein, may have internal wireless charging capability, eliminating the need for battery model specific physical electrical connections at a public charging station. Further, an electronic device, as described herein, may have a second battery embedded therein for continued use of the electronic device while the removable battery is being charged. Moreover, a user of the electronic device may have a spare removable battery for use while the first battery is being charged. Alternately the user may keep the device in a powered-off state with him for safekeeping while the lower value battery is being charged.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An energy storage device, comprising:
at least one energy storage cell; and
a controller configured to:
receive first device identification data from an electronic device and store the first device identification data in a database unit of the energy storage device during a first use of the energy storage cell with the electronic device;
request second device identification data from the electronic device when the electronic device is coupled to the energy storage cell during a subsequent use;
compare the second device identification data to the first device identification data stored in the database unit of the energy storage device; and
enable energy to be conveyed from the at least one energy storage cell to the electronic device coupled to the energy storage device if the second device identification matches the stored first device identification data.

2. The energy storage device of claim 1, wherein the energy storage cell is configured to receive power from a charger via inductive coupling.

3. The energy storage device of claim 1, wherein the controller is further configured to unpair the energy storage device if a received pass code matches a pass code stored within a database of the controller.

4. The energy storage device of claim 1, wherein the controller is further configured to enable energy to be conveyed to the at least one energy storage cell from a charger if device identification data from the charger matches stored device identification data.

5. The energy storage device of claim 1, wherein the controller is further configured to pair with one or more other electronic devices.

6. The energy storage device of claim 1, wherein the controller comprises:
 a database for storing the first device identification data; and
 logic coupled to the database and configured to close a switch to couple the at least one energy storage cell to the electronic device and open the switch to decouple the at least one energy storage cell from the electronic device.

7. The energy storage device of claim 1, wherein the controller is communicatively coupled to a second controller of the electronic device.

8. The energy storage device of claim 1, wherein the controller is further configured to enable energy to be conveyed to the electronic device while requesting the second device identification data from the electronic device and while comparing the device identification data to the stored first device identification data and to stop conveying power if the energy storage device does not authenticate the electronic device.

9. A method for providing power from an energy storage device, comprising:
 receiving and storing first device identification data from an electronic device in the energy storage device during a first use of the energy storage device with the electronic device;
 requesting second device identification data from the electronic device when the electronic device is coupled to the energy storage device during a subsequent use;
 comparing the second device identification data to the first device identification data stored in the energy storage device; and
 conveying energy from the energy storage device to the electronic device coupled to the energy storage device if the second device identification data matches the stored first device identification data.

10. The method of claim 9, further comprising conveying energy from the energy storage device to the electronic device if a pass code received via a user interface of the electronic device matches a stored pass code.

11. The method of claim 9, further comprising conveying energy to the electronic device while requesting the second device identification data from the electronic device and while comparing the second device identification data to stored first device identification data.

12. The method of claim 9, further comprising disabling the energy storage device if the second device identification data does not match the stored first device identification data.

13. An energy storage device, comprising:
 means for receiving and storing first device identification data from an electronic device in the storing means of the energy storage device during a first use of the energy storage device with the electronic device;
 means for requesting second device identification data from the electronic device when the electronic device is coupled to the energy storage device during a subsequent use;
 means for comparing the second device identification data to the first device identification data stored in the storing means of the energy storage device; and
 means for conveying energy from the energy storage device to the electronic device coupled to the energy storage device if the second device identification data matches the stored first device identification data.

14. The device of claim 13, further comprising means for conveying energy to the electronic device while requesting the second device identification data from the electronic device and while comparing the second device identification data to the stored first device identification data.

15. The device of claim 13, further comprising means for receiving a pass code via a user interface of the electronic device and conveying energy from the energy storage device to the electronic device if the received pass code matches a stored pass code.

* * * * *

UNITED STATES PATENT AND TRADEMARK OFFICE
CERTIFICATE OF CORRECTION

PATENT NO. : 8,791,665 B2  
APPLICATION NO. : 12/944207  
DATED : July 29, 2014  
INVENTOR(S) : Roy Howard Davis Page 1 of 1

It is certified that error appears in the above-identified patent and that said Letters Patent is hereby corrected as shown below:

Title page (column 1, Related U.S. Application Data) lines 1-2, Change "Apr. 28, 2010." to --Apr. 08, 2010.--.

In the Specification

In column 7 at line 11, Change ""cloaking"" to --"cloaking."--.

Signed and Sealed this
Twenty-eighth Day of April, 2015

Michelle K. Lee
*Director of the United States Patent and Trademark Office*